United States Patent [19]

Bauser

[11] Patent Number: 4,936,531
[45] Date of Patent: Jun. 26, 1990

[54] MULTI-FUNCTIONAL MOUNTING UNIT FOR A POLICE CAR

[76] Inventor: Chuck J. Bauser, 4802 Pimlico Dr., Del Valle, Tex. 78617

[21] Appl. No.: 347,431

[22] Filed: May 4, 1989

[51] Int. Cl.⁵ .............................................. B60R 11/00
[52] U.S. Cl. ............................... 224/42.11; 224/42.42; 224/913; 211/64; 248/122
[58] Field of Search ............. 224/913, 42.45 R, 42.42, 224/42.11; 248/122, 118, 311.2, 314; 211/64, 107, 86

[56] References Cited

U.S. PATENT DOCUMENTS

| | | | |
|---|---|---|---|
| 2,668,645 | 2/1954 | Pease | 224/913 X |
| 2,692,069 | 10/1954 | Winters et al. | 224/913 X |
| 2,750,088 | 6/1956 | Agostini et al. | 224/913 X |
| 3,964,612 | 6/1976 | Skilliter, Jr. et al. | 224/42.42 X |
| 4,018,339 | 4/1977 | Pritz | 211/64 X |
| 4,097,012 | 6/1978 | McIntyre | 248/674 |
| 4,364,499 | 12/1982 | McCue | 224/913 X |
| 4,560,134 | 12/1985 | Klein | 224/913 X |
| 4,776,471 | 10/1980 | Elkins | 224/42.45 R X |

Primary Examiner—Ramon O. Ramirez
Attorney, Agent, or Firm—Joseph F. Long

[57] ABSTRACT

A multi-functional mounting unit for a police car that removeably bolts to the floor in a front passenger section to rigidly hold a long barreled gun, communication equipment, flashlight, and miscellaneous articles; holding all without structural modification to the car.

1 Claim, 1 Drawing Sheet

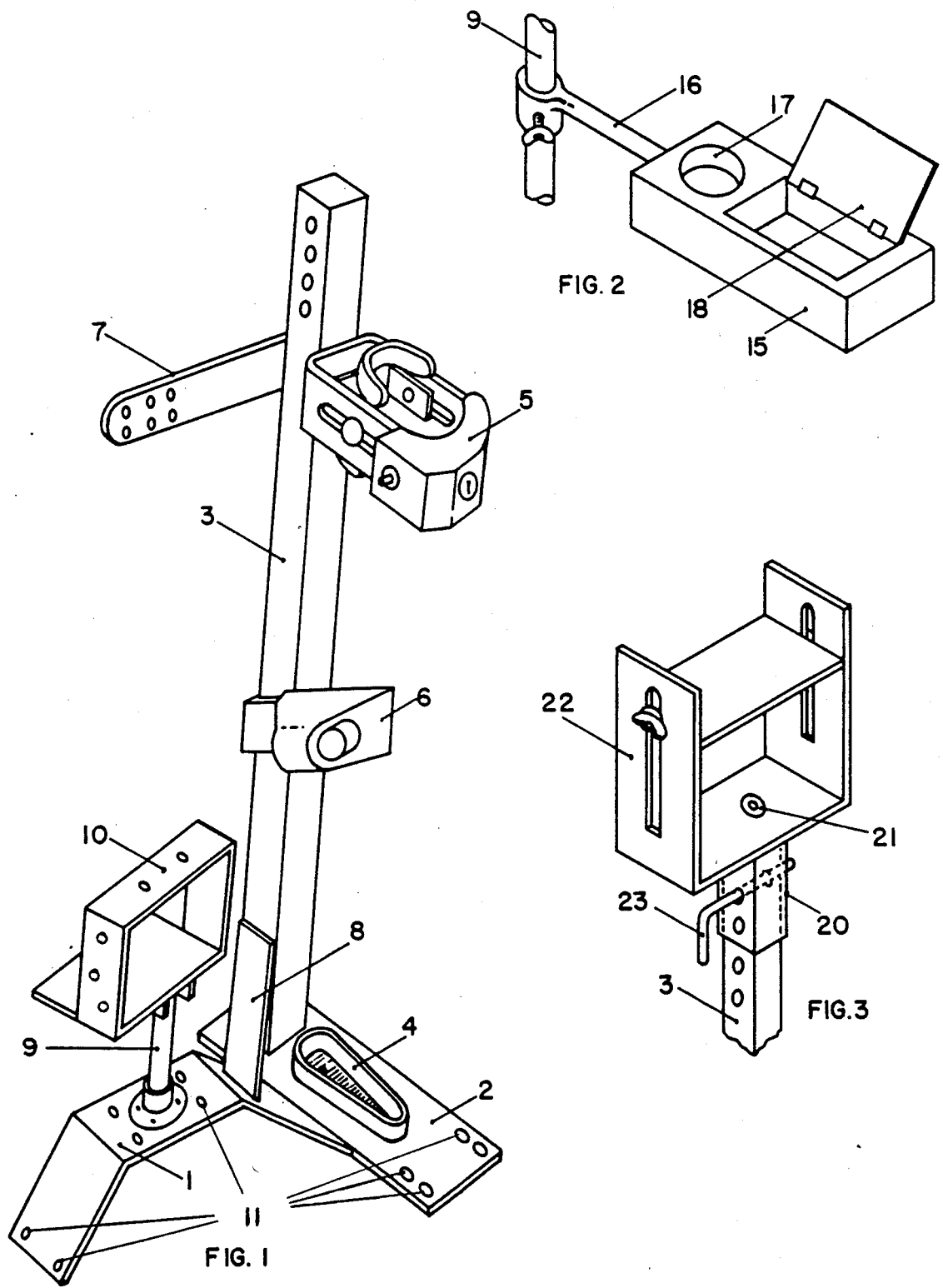

MULTI-FUNCTIONAL MOUNTING UNIT FOR A POLICE CAR

BACKGROUND

Commonly police cars are equipped with one or more shotguns, that may be locked in position, shortwave communication equipment, radar equipment, a flashlight, printed pads, note pads, and pens or pencils. There is a need to store these in an orderly accessible fashion—preferably without major modification of a passenger car in order that the car may be sold at a reasonable price after being retired from use by the police force.

We have considered the following patents:

| Serial No. | Issue Date | Inventor |
|---|---|---|
| 2,750,088 | 6/12/56 | V. A. Agostinetal |
| 3,589,577 | 6/29/71 | H. B. Basinger |
| 3,685,708 | 8/12/72 | F. L. Herrington |
| 3,727,813 | 4/17/73 | G. R. Eby |
| 3,964,612 | 6/22/76 | R. T. Skilliter and A. P. Pietrowski |
| 3,984,161 | 10/5/76 | F. M. Johnson |
| 4,061,971 | 12/6/77 | M. R. Barrons |
| 4,097,012 | 6/27/78 | V. E. McIntyre |
| 4,364,499 | 12/21/82 | M. H. McCue |
| 4,560,134 | 12/24/85 | J. M. Klein |

None of the above patents meet the needs described. The present invention uniquely meets the needs described using a metal post which may be approximately $1\frac{1}{2}'' \times 1\frac{1}{2}''$ and approximately 36" tall welded to a metal footpiece that may be more than $\frac{1}{4}''$ thick with the footpiece designed to fit over the drive shaft hump in the front passenger compartment of an automobile. The footpiece may be anchored with bolts thru the floorboard of the car and/or bolted to the seat bracket. The unit of the present invention has been designed with sufficient strength and rigidity to hold equipment securely in place even during a front end crash in which a car could become a total loss.

BRIEF DESCRIPTION OF THE INVENTION

The invention fills a need to mount various equipment, as later outlined, in a police car without structural modification of the car in a compact readily accessible manner.

The invention comprises:

a. a base plate that may be more than $\frac{1}{4}''$ thick of a truncated triangle shape from a side view and may be more than 4" wide; with one side of the truncated triangle shape welded to a flat plate foot that may be more than 2" wide and $\frac{1}{4}''$ thick; this flat plate foot having two or more holes—one to allow bolting a forward end thru the vehicle floorboard and another to allow bolting under a seat bracket; the other side of the truncated triangle shape portion having holes to allow bolting thru the part of the floorboard forming the hump in the front passenger compartment;

b. a metal post that may be approximately 6" high to the center of a top portion of the truncated triangle shaped base plate; this metal post having a hole to removeably mount a hinged armrest storage unit containing a cupholder and a storage compartment with a hinged cover;

c. an open metal box-like structure bolted to the top of the 6" metal post and having threaded holes to allow adjustably bolting communication equipment within the open metal box like structure;

d. a gun holding post that may be approximately $1\frac{1}{2}'' \times 1\frac{1}{2}''$ in cross section and a minimum of 2' long bolted to the approximate center of the flat plate foot with a bracing rod approximately $\frac{1}{2}''$ in diameter welded to the side of the truncated triangle shape base plate to form a rigid unit. A gun butt holder, preferably lined, is mounted on the lower part of the gun mounting post facing the seat of the vehicle and a lockable barrel clamp is mounted near the top of the post—both being positioned properly to hold a shot-gun or a rifle. Where desired a pair of butt holders and a pair of barrel holders may be mounted side by side for holding the guns;

e. a circular band to hold a flashlight in an off vertical position and a bracket to removeably hold a microphone are mounted on the gun mounting post on the side nearest the driver. Preferably charging circuitry may be in this circular band to maintain the flashlight fully charged using the automobile battery as a power source.

Minor mechanical alterations to the invention are easily visualized by one of normal skill in the art and we do not wish to be limited to exact details but only as to the spirit and purpose of the invention as outlined in these claims and specifications.

BRIEF DESCRIPTION OF THE DRAWINGS

FIG. 1 shows an assembled view of the holder without the auxiliary arm rest storage unit and radar holder.

FIG. 2 shows the arm rest storage unit.

FIG. 3 shows the adjustable radar holder unit.

DETAILED DESCRIPTION OF THE DRAWINGS

FIG. 1 shows an assembled view of a first embodiment of the invention comprising:

a. base plate 1 that is a minimum of 2" wide and is a truncated triangle shape sized to fit over the hump in a front passenger section of a car. The driver's seat would be to the left of the view as shown. The baseplate 1 is welded to the flat plate foot 2. This flat plate foot 2 is sized to contain one or more holes 11 to allow bolting to the seat bracket of the vehicle and other holes 11 to allow bolting thru the floorboard. One or more holes 11 in the side of baseplate 1 allows bolting thru the floorboard to give three or more bolts in a triangle pattern to rigidly fasten the unit to the floorboard;

b. a gun holding post 3 welded to the flat plate foot 2 and welded to a brace 8 that is welded to base plate 1. A gun butt holder 4 is welded near the base of post 3 and a lockable gun barrel holding clamp 5 is aligned with gun butt holder clamp 4 and bolted near the top of post 3. A flashlight holder 6 which may have a charging circuitry therein welded to the side of post and microphone hook 7 bolted to post 3;

c. a post 9 threaded into a flange bolted to the top of base plate 1 with both vertically and horizontally adjustable tiltable mount for communication equipment holder 10. The adjustment may be simply formed by having a series of holes in runners welded to the base of the equipment holder and bolting to the top of the post so that the holder may be tilted; the unit may be moved horizontally by bolting thru a different hole in the series of holes in the runners and the holder may be moved in the threads to face the car occupant. This post 9 contains a hole that is used to removably mount armrest 15, FIG. 2.

In FIG. 2 we show an armrest storage unit 15 with a hinged connection 16 that may be bolted to post 9. The unit further comprising a cupholder 17 and a hinged storage unit cover 18.

In FIG. 3 we show a radar holder unit 22 connected to a sleeve 20 which slides over post 3 and allows adjustment of radar height with a hand tightened set screw 23.

What is claimed is:

1. A multi-functional mounting unit for a police car comprising:
   a. a base plate mounting means that fits over the hump in the front section of a passenger car and contains holes to allow bolting thru the floor board of said passenger car;
   b. a first post fastened to said base plate mounting means with fastening means for a gun butt holder, a gun barrel clamp, a microphone holder and a flashlight holder attached to said post;
   c. a second post, containing a hole, fastened to said base plate mounting means with an adjustable, metal frame, communication equipment mounting means adjustably attached to the top of said second post;
   d. an armrest storage means comprising a cupholder, a storage space closed with a hinged lid and further comprising a hinged fastening means that removeably fastens said armrest storage means to said second post.

* * * * *